United States Patent
Line et al.

(10) Patent No.: US 11,535,134 B2
(45) Date of Patent: Dec. 27, 2022

(54) VEHICLE SEATING ASSEMBLY

(71) Applicant: Ford Global Technologies, LLC, Dearborn, MI (US)

(72) Inventors: Johnathan Andrew Line, Northville, MI (US); Robert Charles Shipley, Plymouth, MI (US); Anna Frances Hardig Hendrickson, Southfield, MI (US); Spencer Robert Hoernke, Dundas (CA); Keith Allen Godin, Dearborn, MI (US); Macit Aktas, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 188 days.

(21) Appl. No.: 17/151,951

(22) Filed: Jan. 19, 2021

(65) Prior Publication Data
US 2022/0227275 A1    Jul. 21, 2022

(51) Int. Cl.
*B60N 2/20*    (2006.01)
*B60N 2/68*    (2006.01)
*B60N 2/28*    (2006.01)

(52) U.S. Cl.
CPC .............. *B60N 2/686* (2013.01); *B60N 2/20* (2013.01); *B60N 2/28* (2013.01); *B60N 2/682* (2013.01)

(58) Field of Classification Search
CPC .......... B60N 2/20; B60N 2/206; B60N 2/686; B60N 2/2893
See application file for complete search history.

(56) References Cited

U.S. PATENT DOCUMENTS

| | | | |
|---|---|---|---|
| 6,139,104 A | 10/2000 | Brewer | |
| 6,328,381 B1 * | 12/2001 | Smuk | B60N 2/366 297/367 R |
| 6,447,066 B1 * | 9/2002 | Chabanne | B60N 2/235 297/378.12 |
| 6,464,299 B1 * | 10/2002 | Castagna | B60N 2/206 297/378.12 |
| 6,513,875 B1 | 2/2003 | Gray et al. | |

(Continued)

FOREIGN PATENT DOCUMENTS

| | | | | |
|---|---|---|---|---|
| DE | 102012015518 A1 * | 5/2014 | ............... | B60N 2/01 |
| DE | 202016004406 U1 * | 11/2017 | | |

(Continued)

*Primary Examiner* — Timothy J Brindley
(74) *Attorney, Agent, or Firm* — Vichit Chea; Price Heneveld LLP

(57) ABSTRACT

A seating assembly includes a seatback frame movable between a reclined position, an upright position, and a folded position and having opposing sides defining a central space. Each opposing side includes a non-linear front edge and a non-linear rear edge. A pivot assembly includes a first plate pivotally coupled with the seatback frame. The first plate includes a forward stop. A second plate is pivotally coupled with the first plate and is fixedly coupled with a seat base frame. The second plate includes a post configured to selectively contact the forward stop. A panel is configured to be coupled with the seatback frame to cover the central space and form a planar surface along the seatback frame. The panel includes upper retention hooks and side retention hooks configured to be engaged with the seatback frame.

18 Claims, 14 Drawing Sheets

(56) References Cited

U.S. PATENT DOCUMENTS

| | | | |
|---|---|---|---|
| 8,256,844 B2* | 9/2012 | Yamazaki | B60N 2/22 297/378.12 |
| 8,955,912 B2* | 2/2015 | Brines | B60N 2/206 297/354.1 |
| 9,834,166 B1 | 12/2017 | Line et al. | |
| 2014/0361594 A1* | 12/2014 | Thiel | B60N 2/235 297/362 |
| 2015/0015053 A1 | 1/2015 | Hong | |
| 2015/0042141 A1* | 2/2015 | Sines | B60N 2/20 297/354.12 |
| 2015/0251579 A1* | 9/2015 | Line | B60N 2/7011 297/452.38 |
| 2015/0329014 A1* | 11/2015 | Elton | B60N 2/20 297/378.12 |
| 2016/0236600 A1 | 8/2016 | Citron et al. | |
| 2016/0257276 A1* | 9/2016 | Line | B60N 2/6673 |
| 2019/0217755 A1* | 7/2019 | Atragene | B60N 2/6018 |
| 2021/0078474 A1* | 3/2021 | Edwards | B60N 2/682 |
| 2021/0101511 A1* | 4/2021 | Berry | B60N 2/68 |
| 2021/0245641 A1* | 8/2021 | Hallock | B60N 2/5825 |
| 2022/0072977 A1* | 3/2022 | Zimmerman, II | B60N 2/12 |

FOREIGN PATENT DOCUMENTS

| | | | | |
|---|---|---|---|---|
| DE | 102017106551 A * | 12/2017 | | B60N 2/28 |
| EP | 2546098 A1 * | 1/2013 | | B60N 2/2245 |
| WO | WO-2013099975 A1 * | 7/2013 | | B60N 2/2809 |
| WO | WO-2015159960 A1 * | 10/2015 | | B60N 2/2809 |

* cited by examiner

VEHICLE SEATING ASSEMBLY

FIELD OF THE DISCLOSURE

The present disclosure generally relates to a panel assembly, and more specifically to a panel assembly for coupling with a vehicle seating assembly.

BACKGROUND OF THE DISCLOSURE

Vehicle seats, particularly rear seating assemblies, may be positioned proximate a cargo space and may be moved to a folded position to enlarge the cargo space.

SUMMARY OF THE DISCLOSURE

According to one aspect of the present disclosure, a seating assembly includes a seat base frame and a seatback frame pivotally coupled with the seat base frame and having opposing sides defining a central space. Each opposing side has a non-linear front edge and a non-linear rear edge. A panel is configured to be coupled with the seatback frame to cover the central space and form a planar surface along the seatback frame. The panel includes upper retention hooks and side retention hooks configured to be engaged with the seatback frame Embodiments of this aspect, or any other aspect, of the disclosure can include any one or a combination of the following features:
- a seatback frame defining upper receiving wells configured to receive upper retention hooks of a panel;
- a seatback frame including an inner edge defining a central space and configured to be engaged with side retention hooks of a panel;
- cushioning positioned proximate a seatback frame and cover stock positioned over at least one of the cushioning and the seatback frame, wherein a panel at least partially overlaps one of the cushioning and the cover stock;
- cushioning positioned proximate a seatback frame, cover stock positioned over at least one of the cushioning and the seatback frame, wherein a panel is concealed by the cover stock, and a fastener for at least partially removing the cover stock to access the panel;
- a panel including wings positioned to align with non-linear rear edges of opposing sides of a seatback frame;
- wings of a panel defining spaces for accessing side retention hooks such that the panel is removably coupled with a seatback frame;
- a panel including an upper portion defining an opening, and a child tether attachment member coupled with a seatback frame and accessible through the opening; and/or
- a panel including a cover coupled with an upper portion to selectively conceal an opening.

According to another aspect of the present disclosure, a seating assembly includes a seatback frame defining a central space and movable between a reclined position, an upright position, and a folded position. A pivot assembly of the seating assembly includes a first post extending from one of the opposing sides of the seatback frame. A first plate defines a slot configured to receive the first post. The post is positioned at a first end of the slot when the seatback frame is in the reclined position and is positioned at a second end of the slot when the seatback frame is in the folded position. A forward stop extends from a lower edge of the first plate. A second plate is pivotally coupled with the first plate and is fixedly coupled with a seat base frame. The second plate includes a second post configured to selectively contact the forward stop.

Embodiments of this aspect, or any other aspect, of the disclosure can include any one or a combination of the following features:
- a pivot assembly including a rear stop coupled with the first plate and configured to selectively contact a second post of a second plate;
- a panel configured to be coupled with the seatback frame to cover the central space and form a planar surface along the seatback frame;
- a pivot assembly including a spring coupled with a first post and configured to bias a seatback frame toward a reclined position; and/or
- a seatback frame spaced apart from a seat base frame in a folded position.

According to another aspect of the present disclosure, a seating assembly includes a seatback frame movable between a reclined position, an upright position, and a folded position and having opposing sides defining a central space. Each opposing side includes a non-linear front edge and a non-linear rear edge. A pivot assembly includes a first plate pivotally coupled with the seatback frame. The first plate includes a forward stop. A second plate is pivotally coupled with the first plate and is fixedly coupled with a seat base frame. The second plate includes a post configured to selectively contact the forward stop. A panel is configured to be coupled with the seatback frame to cover the central space and form a planar surface along the seatback frame. The panel includes upper retention hooks and side retention hooks configured to be engaged with the seatback frame.

Embodiments of this aspect, or any other aspect, of the disclosure can include any one or a combination of the following features:
- a panel including wings positioned to align with non-linear rear edges of the opposing sides of a seatback frame and defining receiving spaces aligned with side retention hooks;
- a pivot assembly including a rear stop coupled with the first plate and configured to selectively contact a post of a second plate;
- one of the opposing sides of a seatback frame including a guide post and a first plate of the pivot assembly defining a guide slot configured to receive the guide post;
- a guide post positioned at a first end of a guide slot when a seatback frame is in a reclined position and is positioned at a second end of the guide slot when the seatback frame is in a folded position; and/or
- a seatback frame spaced apart from a seat base frame in a folded position.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Figure 1:
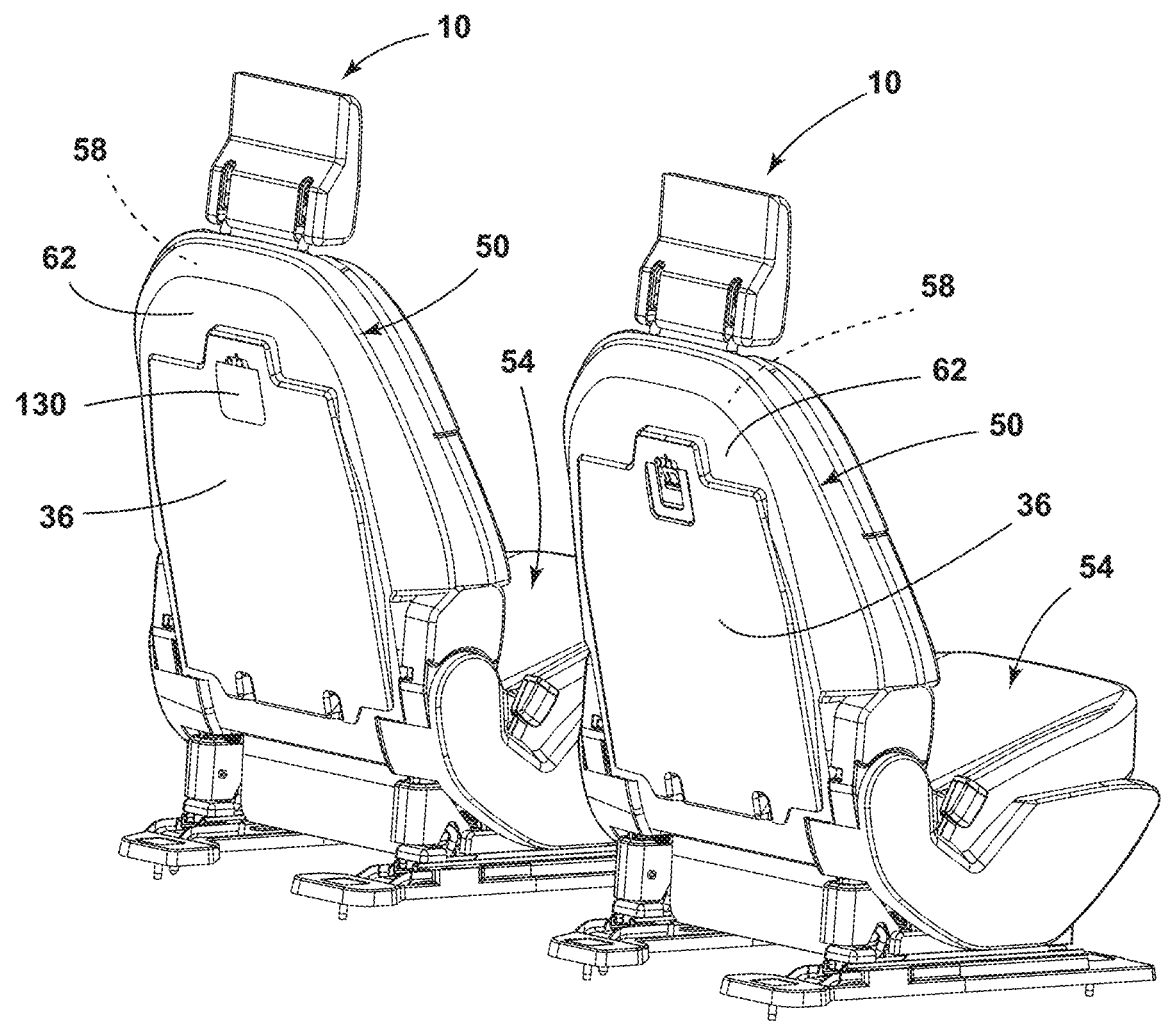
FIG. 1 is a rear perspective view of a pair of seating assemblies each including a panel, according to various examples.

The present illustrated embodiments reside primarily in combinations of method steps and apparatus components related to a swivel assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 10:
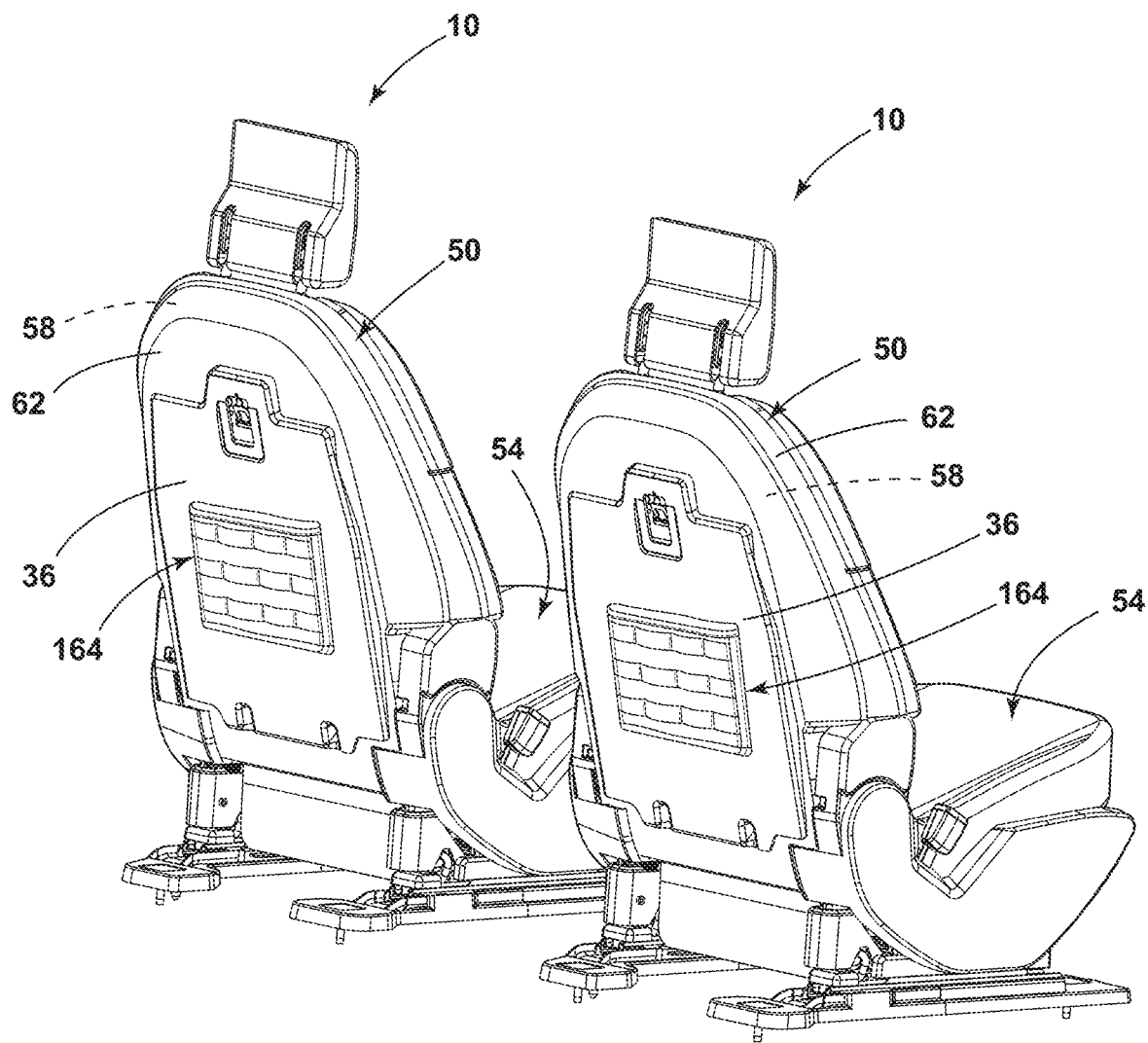
FIG. 10 is a rear perspective view of a pair of seating assemblies each including a panel, according to various examples.
Figure 11:
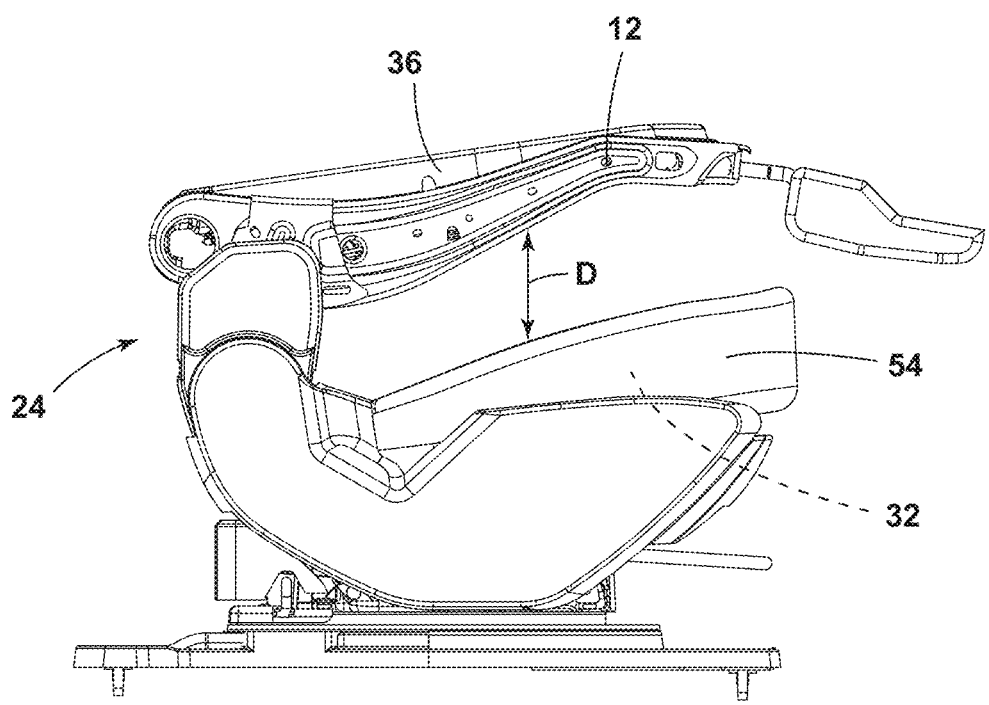
FIG. 11 is a side profile view of a seating assembly in a folded position and including a panel, according to various examples.
Figure 12:
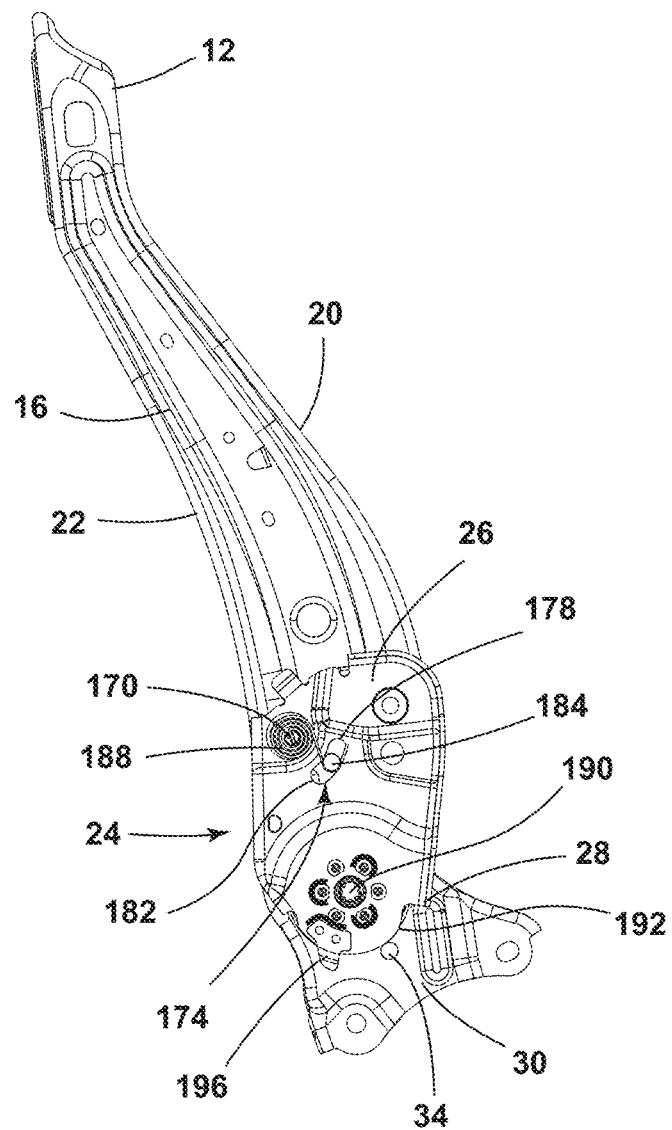
FIG. 12 is a side profile view of a seatback frame and pivot assembly of the seating assembly of FIG. 11 with the seatback frame in an upright position.

Referring to FIGS. 1-12, reference numeral 10 generally designates a seating assembly including a seatback frame 12 movable between an upright position (FIG. 11) and a folded position (FIG. 12). The seatback frame 12 has opposing sides 14, 16 defining a central space 18. Each opposing side 14, 16 includes a non-linear forward edge 20 and a non-linear rear edge 22. A pivot assembly 24 includes a first plate 26 pivotally coupled with the seatback frame 12 and including a forward stop 28. A second plate 30 is pivotally coupled with the first plate 26 and is fixedly coupled with a seat base frame 32. The second plate 30 includes a post 34 configured to selectively contact the forward stop 28. A panel 36 is configured to be coupled with the seatback frame 12 to cover the central space 18 and form a planar surface along the seatback frame 12. The panel 36 includes upper retention hooks 38 and side retention hooks 40 configured to be engaged with the seatback frame 12.

Figure 2:
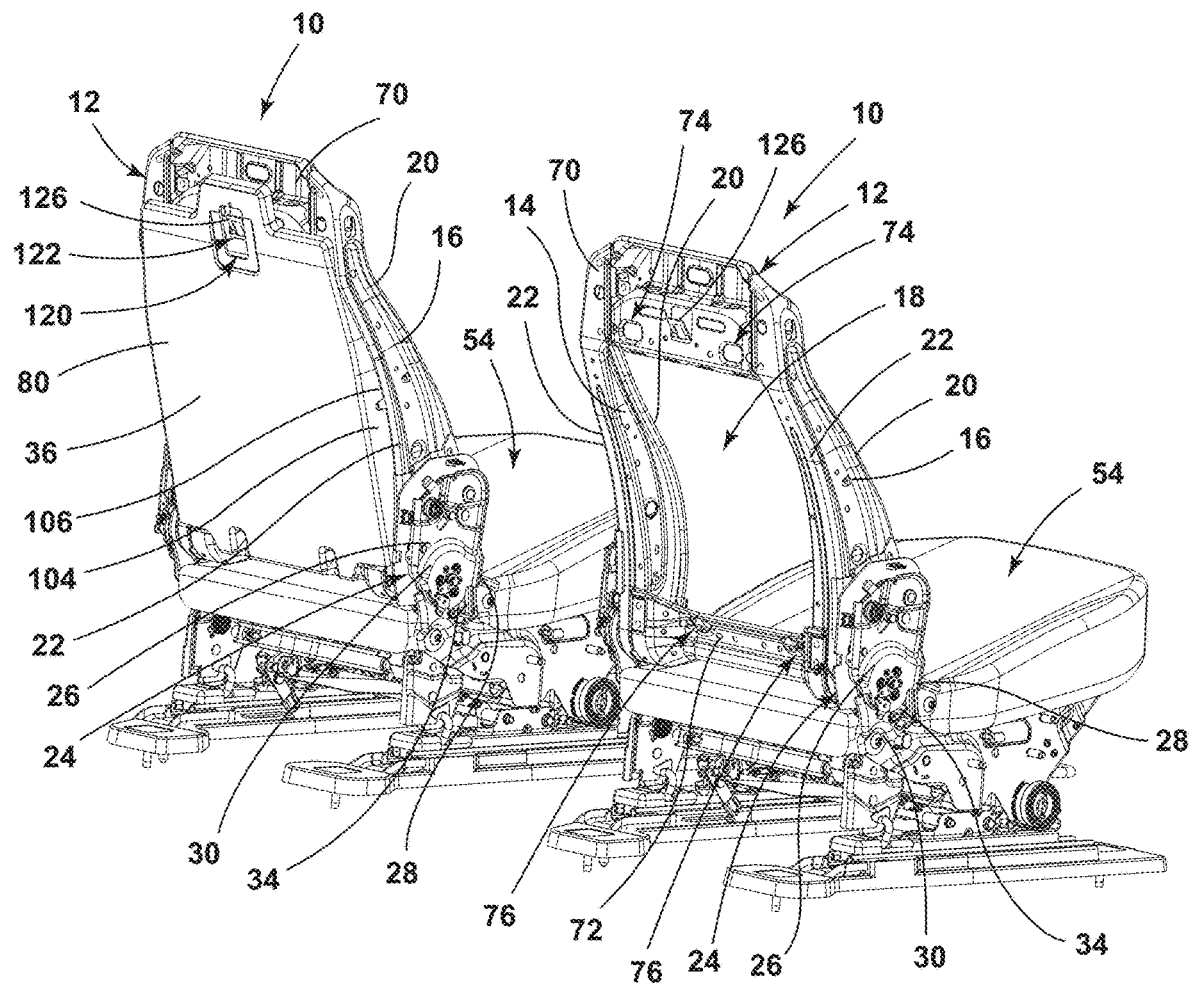
FIG. 2 is a rear perspective view of frames of the pair of seating assemblies of FIG. 1 with one including a panel.

Referring now to FIGS. 1 and 2, a pair of seating assemblies 10 are illustrated, according to various examples. Each of the pair of seating assemblies 10 includes a seatback 50 pivotally coupled with a seat base 54. The seatback 50 includes a seatback frame 12, and the seat base 54 includes a seat base frame 32. The seatback frame 12 is operably coupled with the seat base frame 32 by a pivot assembly 24. Cushioning 58 is positioned over the seatback frame 12 and the seat base frame 32 and may be covered by cover stock 62 (e.g., upholstery).

As best shown in FIG. 1, a panel 36 may be coupled with the seatback 50 such that each seating assembly 10 further includes a respective panel 36. The panel 36 is configured to be aligned with the cushioning 58 such that the cover stock 62 at least partially surrounds the panel 36. In various examples, the panel 36 may be configured to at least partially overlap the cushioning 58 and/or the cover stock 62. In other examples, the cover stock 62 may be configured to cover the panel 36, as discussed in more detail elsewhere herein. It will be understood that any configuration of cushioning 58 and cover stock 62 may be used without departing from the scope of the present disclosure. It will further be understood that the cushioning 58 may be formed of foam or any other material and the cover stock 62 may be upholstery or any other material configured to cover a seating assembly 10.

Referring now to FIG. 2, the pair of seating assemblies 10 are shown with the cushioning 58 and cover stock 62 of FIG. 1 removed. The left seating assembly 10 includes the panel 36 coupled with the seatback frame 12, and the right seating assembly 10 is illustrated with the respective panel 36 removed. As illustrated, the seatback frame 12 of each seating assembly 10 includes first and second opposing sides 14, 16. Each of the first and second opposing sides 14, 16 includes a forward edge 20 and a rear edge 22. The first and second opposing sides 14, 16 are curved to form a lumbar region of the seating assembly 10. In other words, one or both of the forward edge 20 and the rear edge 22 of each of the first and second opposing sides 14, 16 is generally non-linear to form the lumbar region.

With continued reference to FIG. 2, the seatback frame 12 further includes an upper portion 70 and a lower portion 72 extending between the first and second opposing sides 14, 16. The first and second opposing sides 14, 16, the upper portion 70, and the lower portion 72 at least partially define a central space 18 of the seatback frame 12. The upper portion 70 defines upper receiving wells 74 configured to at least partially receive the upper retention hooks 38 of the panel 36 to couple the panel 36 with the seatback frame 12, as discussed in more detail elsewhere herein. The lower portion 72 defines lower receiving wells 76 configured to receive fasteners 78 to couple the panel 36 with the seatback frame 12, as discussed in more detail elsewhere herein.

It will be understood that the seating assemblies 10 illustrated herein may be configured to be used in any type of vehicle, such as a car, a truck, a van, etc. It will further be understood that the plurality of seating assemblies 10 may be positioned in any number of rows within a vehicle and may be positioned in any configuration or orientation without departing from the scope of the present disclosure. It is also contemplated that the panel 36 concept set forth in this disclosure may be utilized with individual seating assemblies 10, bench seats, or any other configuration of vehicle seating assembly, depending on the configuration of the vehicle.

Figure 3:
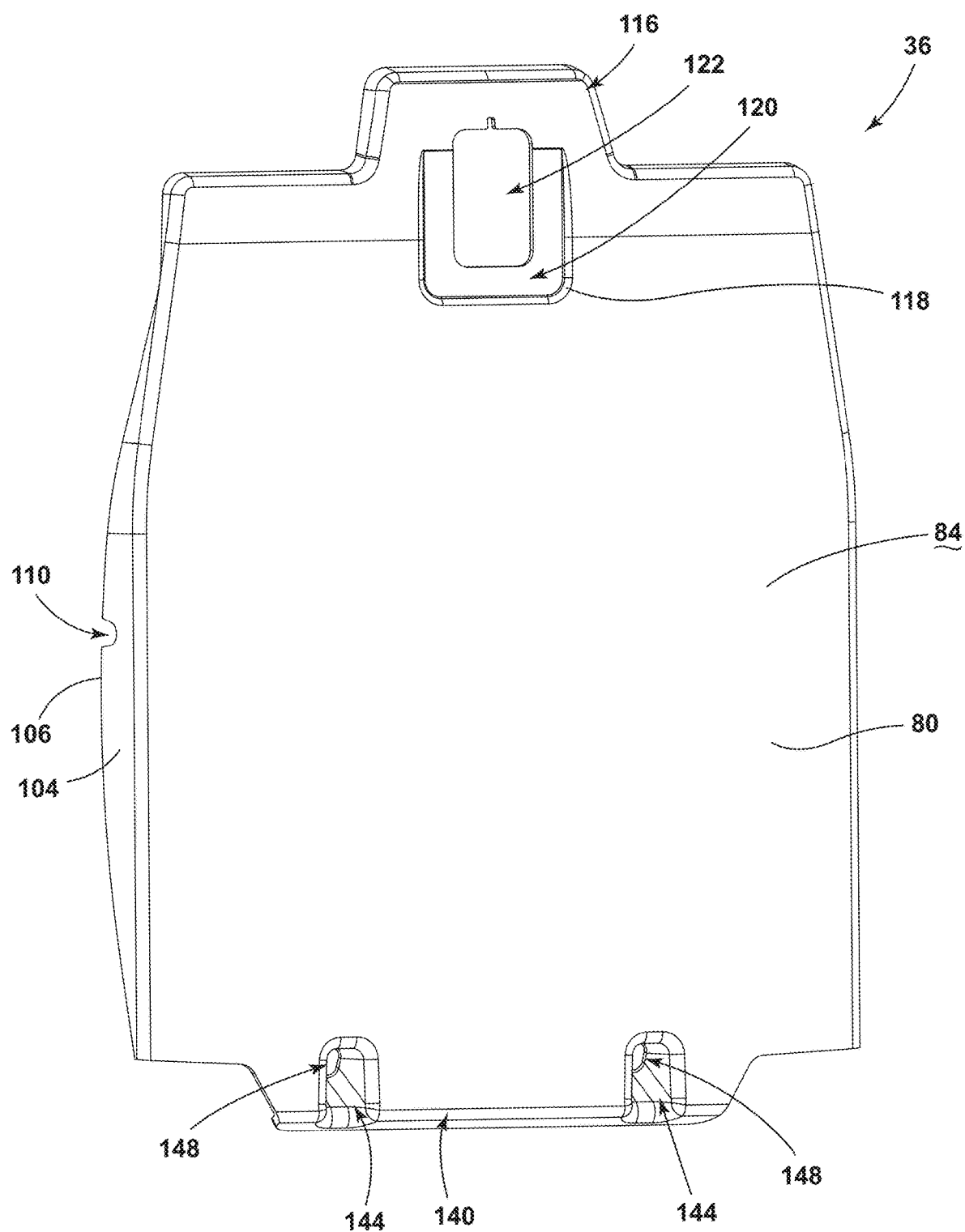
FIG. 3 is a rear perspective view of one of the panels of FIG. 1 independent of the respective seating assembly.
Figure 4:
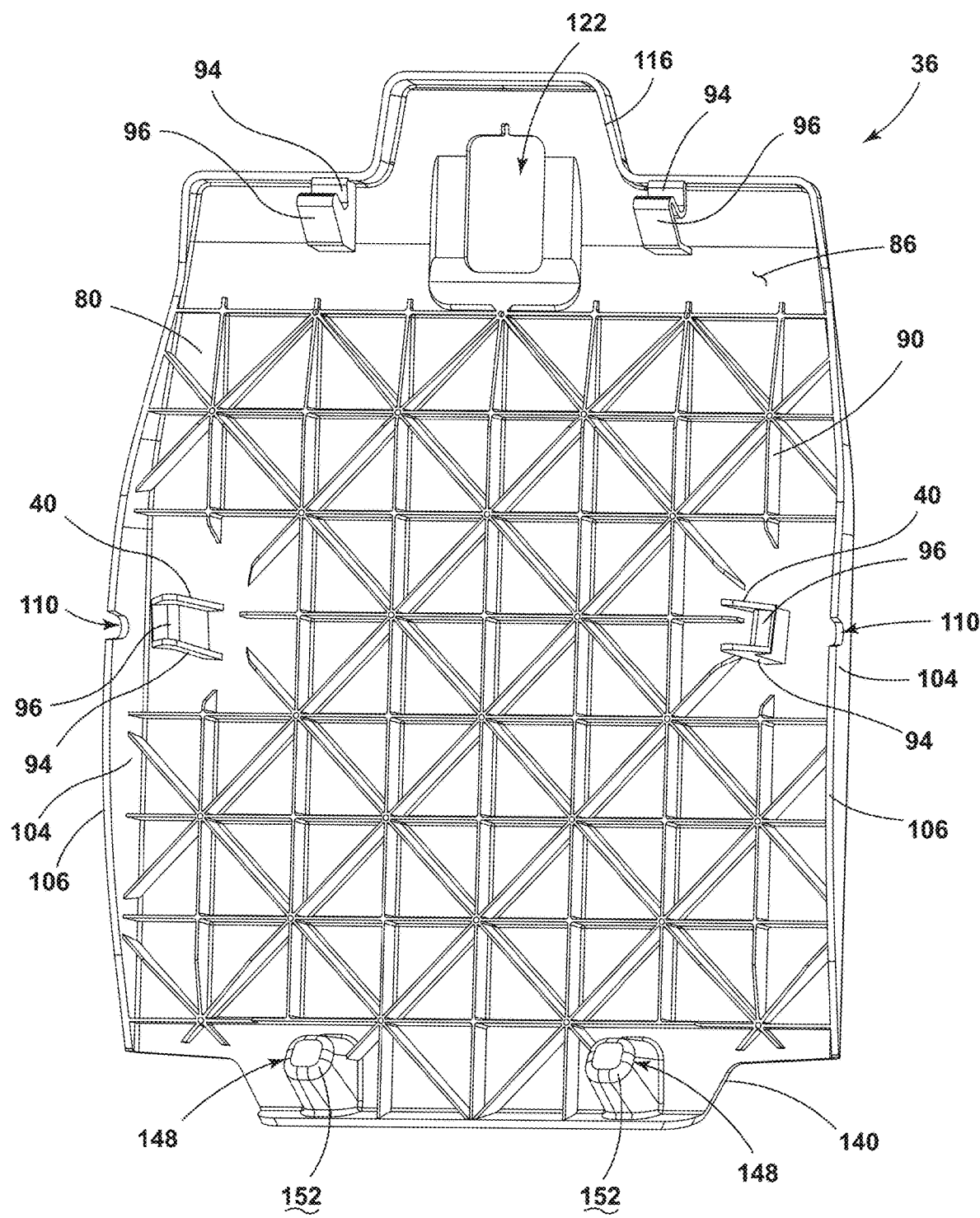
FIG. 4 is a front perspective view of the panel of FIG. 3.

As shown in FIGS. 3 and 4, the panel 36 includes a body portion 80 having an outer surface 84 and an inner surface 86. The outer surface 84 may be substantially planar such that the outer surface 84 is configured to form a planar surface along the seatback 50 when the panel 36 is coupled with the seatback frame 12. The outer surface 84 may be configured to be customized by a user. For example, the outer surface 84 may be configured to have various textures including, but not limited to, for example, carpet, fabric, wood, or plastic.

As best shown in FIG. 4, the inner surface 86 of the panel 36 may include ribs 90 configured to reinforce the panel 36. The ribs 90 may be positioned in a crossing pattern across at least a portion of the body portion 80 of the panel 36, as illustrated, or may be positioned in any other pattern configured to reinforce the panel 36. The ribs 90 may have varying heights and lengths to complement the shape of the body portion 80 of the panel 36.

The inner surface 86 of the panel 36 may further include the upper retention hooks 38 and the side retention hooks 40, as previously introduced. Each of the upper retention hooks 38 and the side retention hooks 40 extend outward from the inner surface 86. Each of the retention hooks 38, 40 may include a base 94 integrally formed with the inner surface 86 of the panel 36. An engagement portion 96 extends from the base 94 of each of the retention hooks 38, 40 and is configured to selectively engage with the seatback frame 12, as discussed in more detail below.

Figure 5:
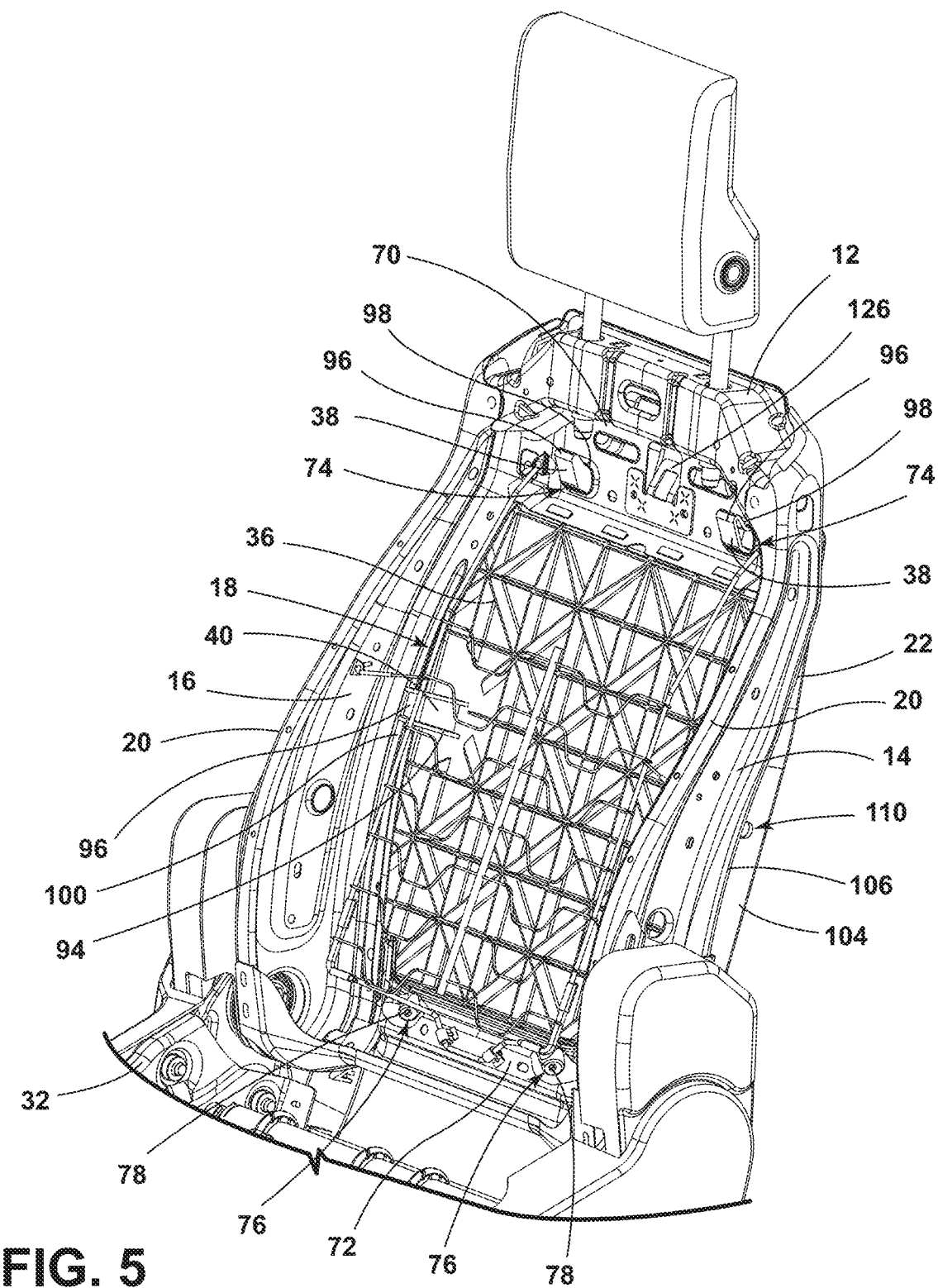
FIG. 5 is a front perspective view of one of the seating assemblies of FIG. 2 including the respective panel.

As shown in FIGS. 3 and 5, the panel 36 may include a pair of upper retention hooks 38. Each of the upper retention hooks 38 is configured to be received by a respective upper receiving well 76 of the upper portion 70 of the seatback frame 12. As shown in FIG. 5, the engagement portion 96 of each upper retention hook 38 extends through the upper receiving well 76 to at least partially couple the panel 36 with an interior edge 98 of the seatback frame 12. It will be understood that the panel 36 may include any number of upper retention hooks 38 without departing from the scope of the present disclosure. It will further be understood that the upper retention hooks 38 may be configured to engage with the seatback frame 12 in other locations.

The inner surface 86 of the panel 36 may further include a pair of side retention hooks 40 positioned on opposing sides of the body portion 80 of the panel 36. The engagement portions 96 of each of the side retention hooks 40 extend from the respective base 94 outward toward the respective side of the body portion 80. Each of the side retention hooks 40 is configured to engage with an inner edge 100 of the seatback frame 12. In other words, the engagement portion 96 of each of the side retention hooks 40 is configured to engage with an inner edge 100 of the seatback frame 12. While only two side retention hooks 40 are illustrated, it is contemplated that any number of side retention hooks 40 may be used without departing from the scope of the present disclosure. It will also be understood that the side retention hooks 40 may be engaged with other portions of the seatback frame 12 to couple the panel 36 with the seatback frame 12.

Referring now to FIGS. 3-5, the panel 36 further includes first and second wings 104 extending from opposing sides of the body portion 80. Each of the wings 104 is integrally formed with the body portion 80 and may be positioned substantially perpendicular to the outer surface 84 of the body portion 80. Each of the wings 104 includes a non-linear edge 106 configured to aligned with the rear edge 22 of the respective side 14, 16 of the seatback frame 12. Each wing 104 is positioned proximate one of the side retention hooks 40 and may further define a receiving space 110 extending through the wing 104. The receiving space 110 of each wing 104 is aligned with a respective side retention hook 40 and is configured to provide access to the side retention hook 40 to allow selective release of the panel 36 from the seatback frame 12. For example, a tool may be inserted through the receiving space 110 of the wing 104 to apply pressure to disengage the engagement portion 96 of the side retention hook 40 from the seatback frame 12. Each wing 104 may be configured to define the same number of receiving spaces 110 as the number of side retention hooks 40 positioned on the respective side of the panel 36.

Figure 6:
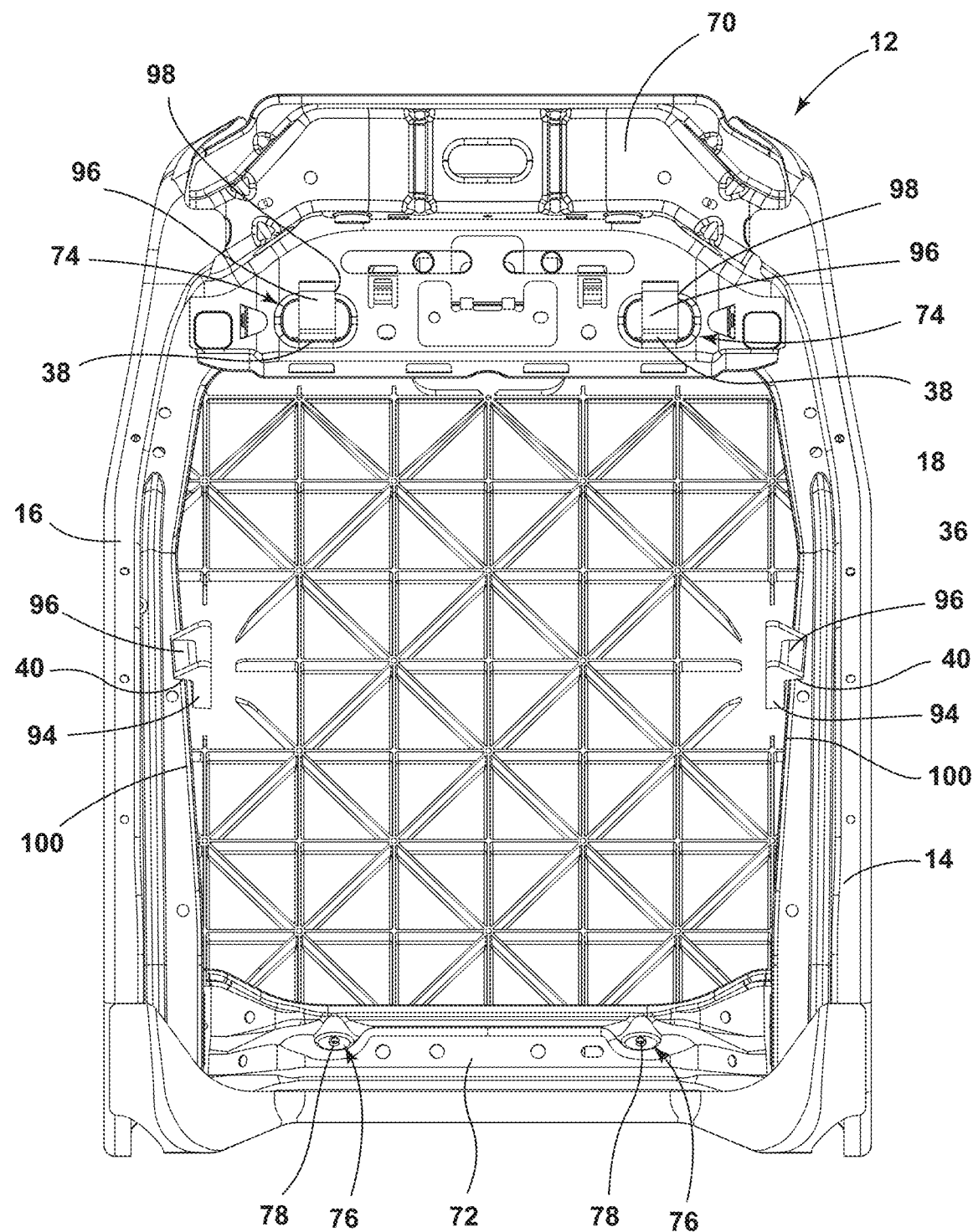
FIG. 6 is a front elevation view of a seatback frame of the seating assembly of FIG. 5 including the panel.
Figure 7:
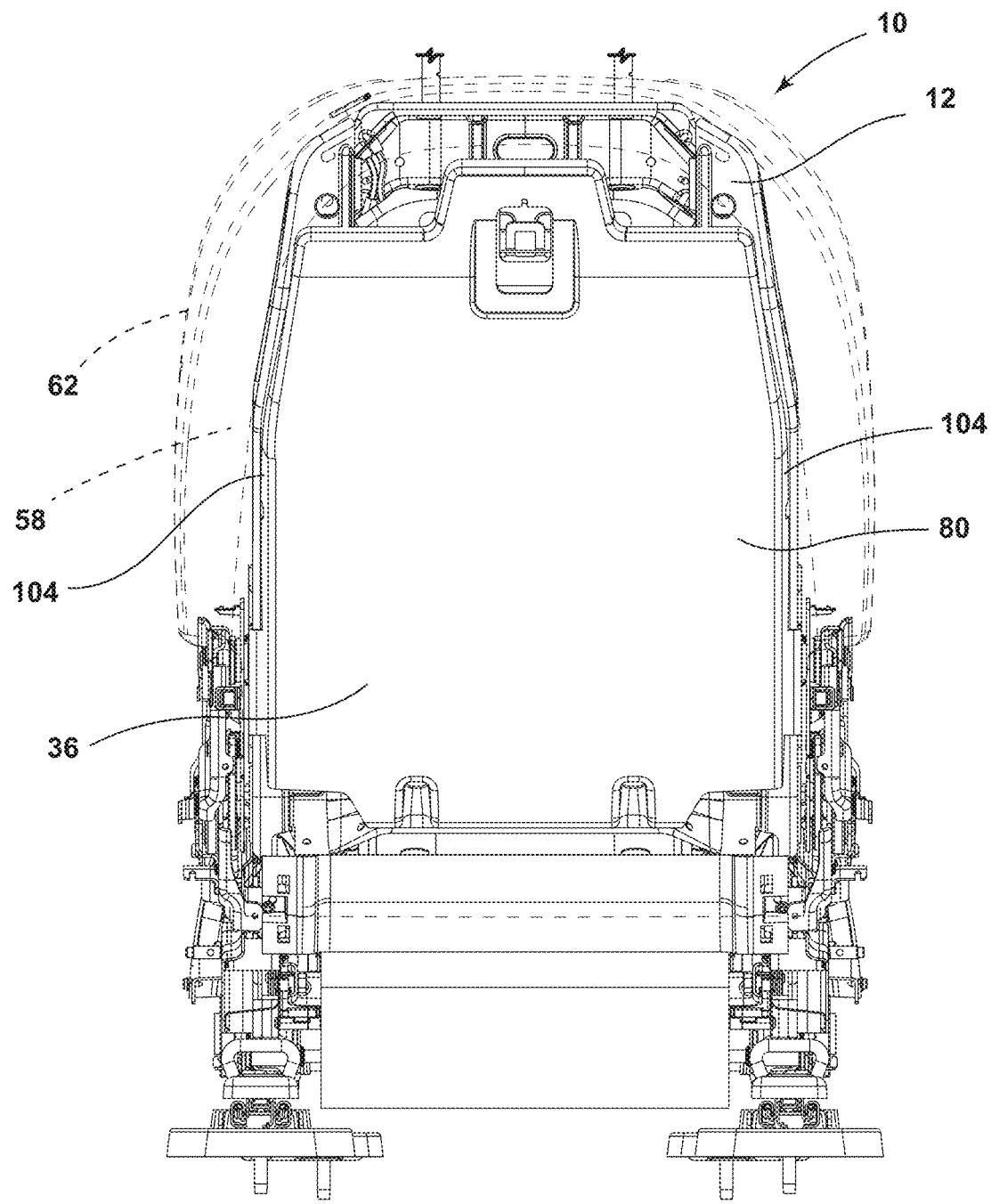
FIG. 7 is a rear elevation view of a seating assembly including a panel, according to various examples.

As illustrated in FIGS. 5-7, the body portion 80 may be shaped to fully cover the central space 18 of the seatback frame 12. As previously described, the panel 36 includes the body portion 80 and wings 104. The panel 36 may further include an upper portion 116 extending upward from the body portion 80. The upper portion 116 may be configured to at least partially cover a child seat tether assembly 126 positioned on the upper portion 70 of the seatback frame 12. A recess 120 may be defined by the upper portion 116 and aligned with the child seat tether assembly 126 when the panel 36 is coupled with the seatback frame 12. The recess 120 may be at least partially defined by an inner lip 118 of the panel 36 and is defined to at least partially frame an opening 122. The opening 122 may be substantially rectangular and may be configured to be at least partially covered by a removable and/or movable cover 130 (FIG. 1). As shown in FIG. 5, the opening 122 is aligned with the child seat tether assembly 126 and may be configured to at least partially receive the child seat tether assembly 126.

As illustrated in FIGS. 3-5, the body portion 80 further includes a lower edge 140 and a plurality of coupling recesses 144 defined by the body portion 80 proximate the lower edge 140. Each of the coupling recesses 144 is in communication with a corresponding through-hole 148. When the panel 36 is coupled with the seatback frame 12, each through-hole 148 is aligned with one of the lower receiving wells 76 of the lower portion 72 of the seatback frame 12 and is configured to receive a respective fastener 78 to couple the panel 36 with the seatback frame 12. Each through-hole 148 may be defined by an interior surface 152 positioned within the respective coupling recess 144 and configured to abut the lower portion 72 of the seatback frame 12 when the panel 36 is coupled with the seatback frame 12. It is contemplated that the panel 36 may include any number of coupling recesses 144 without departing from the scope of the present disclosure.

Figure 8:
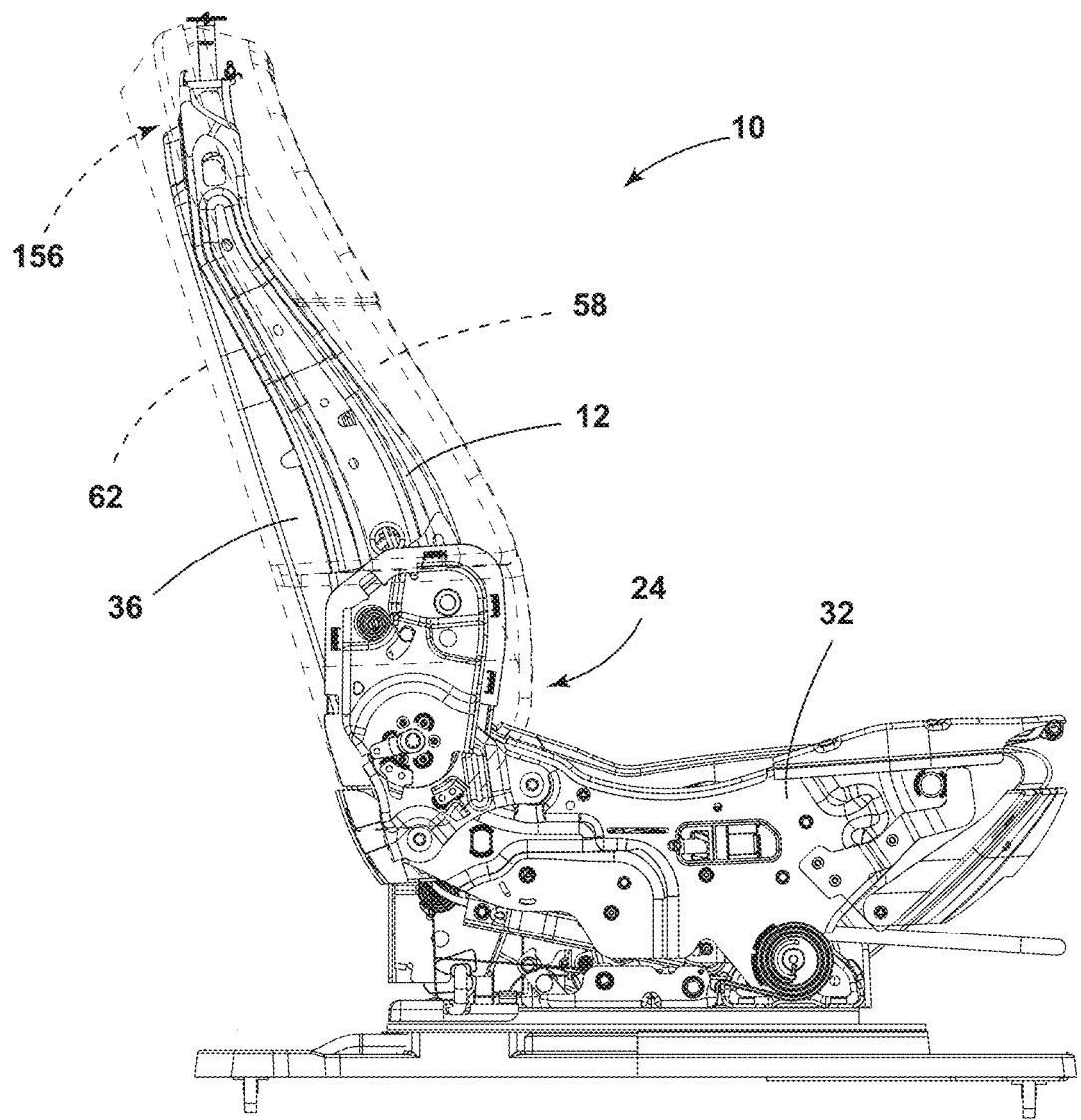
FIG. 8 is a side profile view of a seating assembly including a panel concealed by a cover stock, according to various examples.
Figure 9:
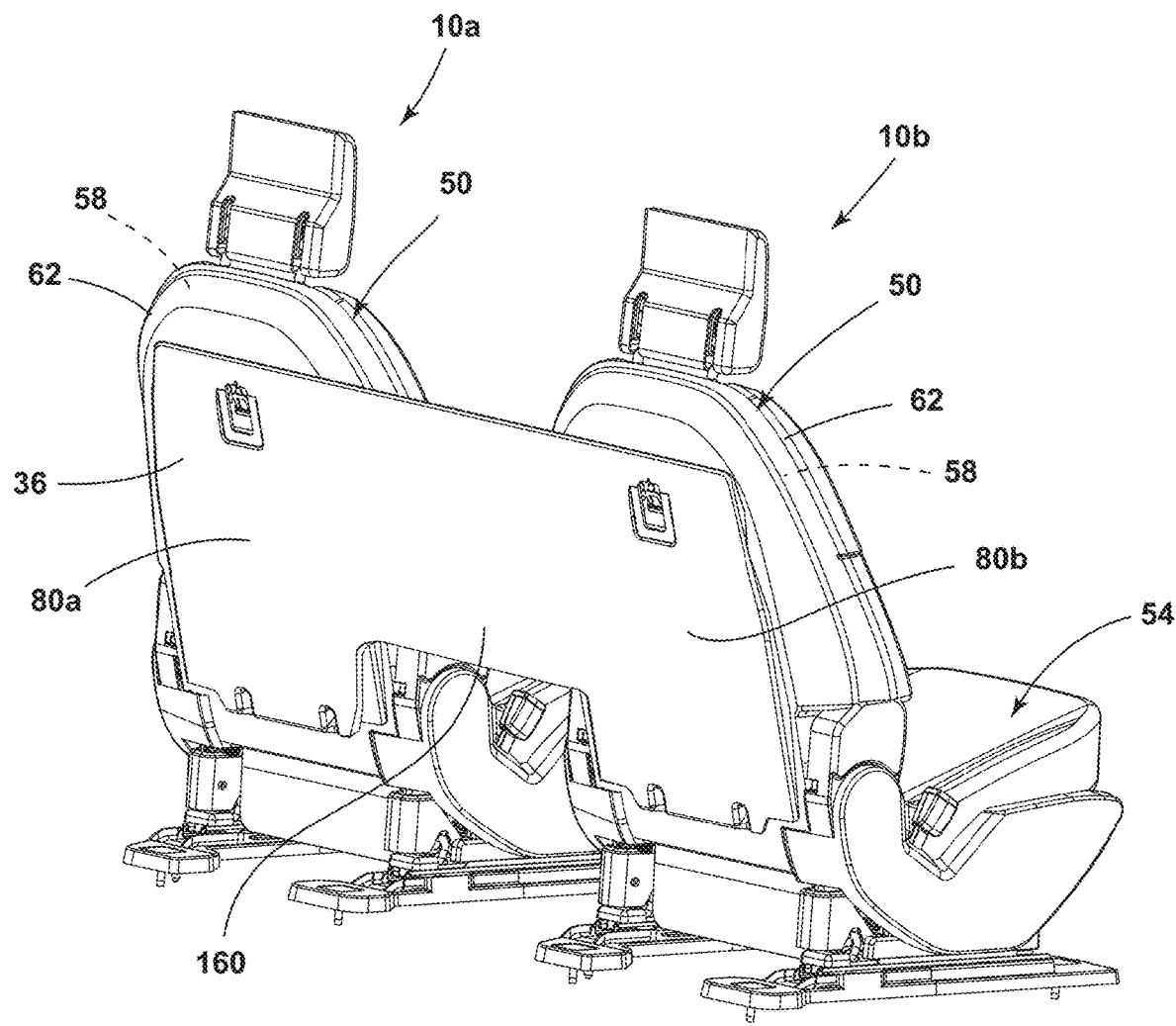
FIG. 9 is a rear perspective view of a pair of seating assemblies including a single panel, according to various examples.

Referring now to FIGS. 8-10, the seating assembly 10 and panel 36 may be adjusted in various ways for various uses. For example, as previously noted, the panel 36 may be configured to be covered by the cover stock 62 (FIG. 8). Where the cover stock 62 covers the panel 36, the cover stock 62 may include a fastener 156 (e.g., a zipper) configured to allow selective removal of the cover stock 62 to provide access to the panel 36. In other examples, as shown in FIG. 9, a panel 36 may be configured to extend over multiple seating assemblies 10. The panel 36 may include a first body portion 80a coupled with a first seating assembly 10a and a second body portion 80b coupled with a second seating assembly 10b. A connection portion 160 may extend between the first and second body portions 80a, 80b and may be integrally formed with the body portions 80a, 80b. In still other examples, storage members 164 may be positioned on and/or integrally formed with the outer surface 84 of the panel 36, as shown in FIG. 10. It will be understood that the storage members 164 illustrated are exemplary only and may be replaced with other storage features without departing from the scope of the present disclosure.

Figure 13:
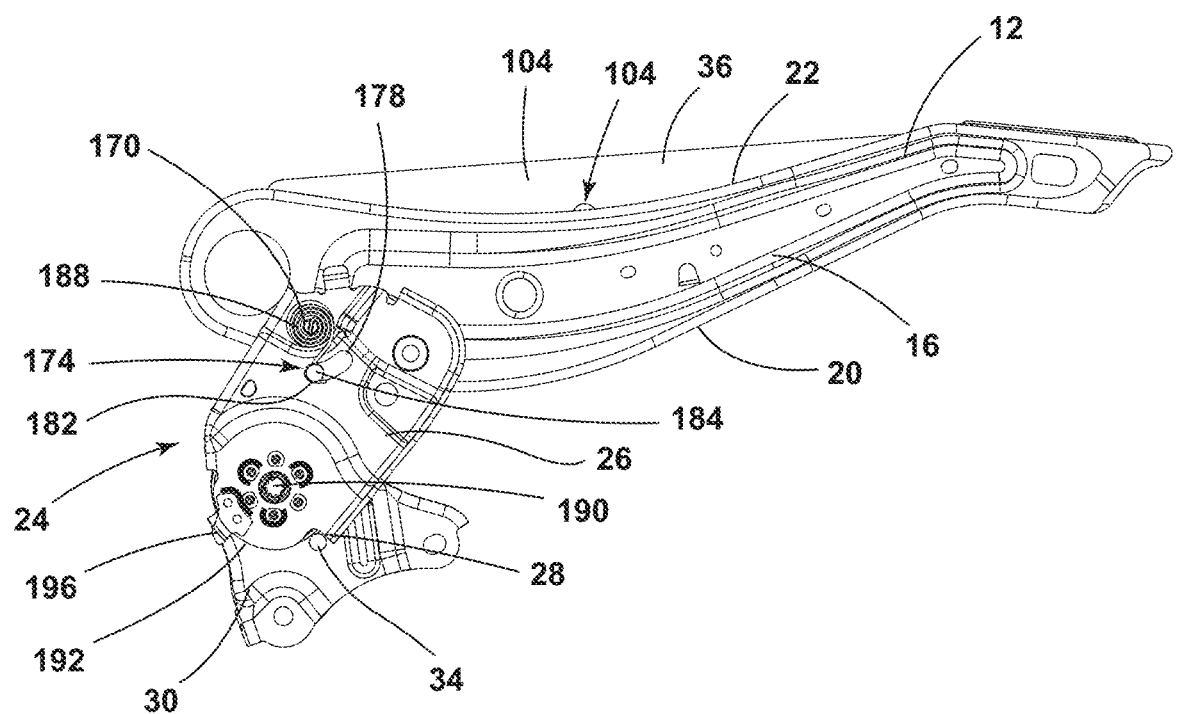
FIG. 13 is a side profile view of a seatback frame and pivot assembly of the seating assembly of FIG. 11 with the seatback frame in a folded position.
Figure 14:
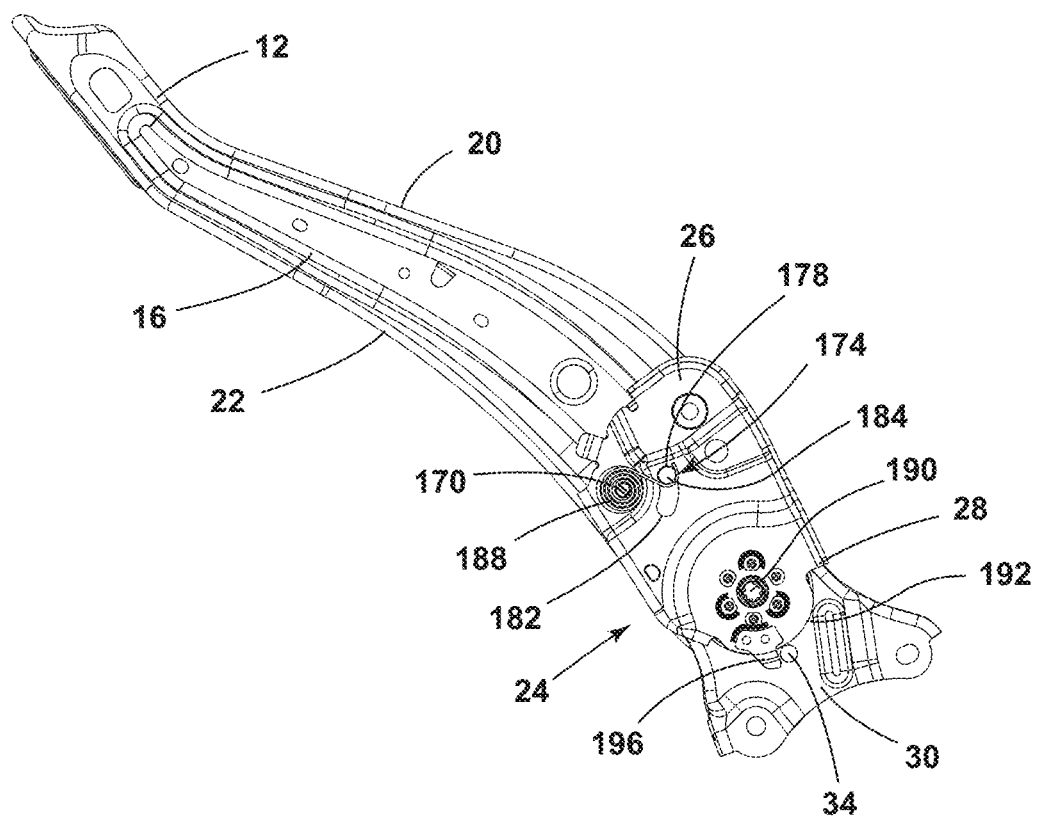
FIG. 14 is a side profile view of a seatback frame and pivot assembly of the seating assembly of FIG. 11 with the seatback frame in a reclined position.

Referring now to FIGS. 11-13, the seating assembly 10 may further include a pivot assembly 24 configured to provide a clearance space D between the seatback frame 12 and the seat base frame 32 and allow for the panel 36 to be positioned substantially horizontally when in the seatback frame 12 is in a folded position (see FIG. 11). FIGS. 12-14 illustrate the seatback frame 12 and the pivot assembly 24 independent of the seating assembly and in various positions, as discussed in more detail below. While only one pivot assembly 24 is being described, it will be understood that the seating assembly 10 may include a single pivot assembly 24 or may include a respective pivot assembly 24 coupled with each side 14, 16 of the seatback frame 12 and that the pivot assemblies 24 may be configured to work in tandem to move the seatback frame 12 between the various positions.

Referring now to FIGS. 12-14, and as previously introduced, the pivot assembly 24 includes a first plate 26 coupled with the seatback frame 12 and a second plate 30 fixedly coupled with the seat base frame 32 (see FIG. 2). The first plate 26 is rotatably coupled with the seatback frame 12 at a first pivot 170 such that the seatback frame 12 is rotatable relative to the first plate 26. The first pivot 170 may be formed by a pin or any other member configured to allow the seatback frame 12 to rotate between an upright position (FIG. 12), a folded position (FIG. 13), and a reclined position (FIG. 14).

The seatback frame 12 may further include a guide post 178 extending outward from the respective side 16 of the seatback frame 12. The guide post 178 is configured to be received by a guide slot 174 defined by the first plate 26. The guide slot 174 may be defined proximate the first pivot 170. As illustrated, the guide slot 174 may be non-linear and may include first and second ends 182, 184. The guide post 178 is configured to move along the guide slot 174 and between the first and second ends 182, 184. For example, when the guide post 178 is positioned at the first end 182 of the guide slot 174, the seatback frame 12 is in the reclined position (see FIG. 14). When the guide post 178 is positioned at the second end 184 of the guide slot 174, the seatback frame 12 is in the folded position (see FIG. 13). The guide post 178 may further be positioned between the first and second ends 182, 184 of the guide slot 174 when the seatback frame 12 is in the up-right position. It is contemplated that the seatback frame 12 may be configured to be retained in various other positions between the first and second ends 182, 184 without departing from the scope of the present disclosure.

As shown in FIGS. 12-14, the first pivot 170 may be formed as a pin configured to engage with a clock spring 188. The clock spring 188 may be engaged with the guide post 178 of the seatback frame 12 and may be configured to bias the seatback frame 12 into the reclined position. In other words, the clock spring 188 is configured to bias the guide post 178 toward the first end 182 of the guide slot 174.

With continued reference to FIGS. 12-14, the first plate 26 is rotatably coupled with the second plate 30 at a second pivot 190 such that the pivot assembly 24 is a dual cam pivot assembly 24. The second pivot 190 may be configured as a recliner heart or may be configured as any other member configured to allow the first plate 26 to rotate relative to the second plate 30. As illustrated, the first plate 26 is movable between a first position (FIG. 13) and a second position (FIG. 14) and may be configured to be held at one or more intermediate positions between the first and second positions (FIG. 12).

The first plate 26 includes a lower edge 192 that may be framed by a forward stop 28 and a rear stop 196. Each of the forward and rear stops 28, 196 extends from the lower edge 192 of the first plate 26. The lower edge 192 may be configured to extend non-linearly between the forward and rear stops 28, 196. As illustrated in FIGS. 12-14, the forward stop 28 may be integrally formed with the lower edge 192 of the first plate 26, and the rear stop 196 may be coupled with the lower edge 192 of the first plate 26. However, it is contemplated that the forward stop 28 may be coupled with the lower edge 192 of the first plate 26 without departing from the scope of the present disclosure. It is further contemplated that the rear stop 196 may be integrally formed with the lower edge 192 of the first plate 26 without departing from the scope of the present disclosure.

Referring still to FIGS. 12-14, the second plate 30 includes a post 34 extending outward from the second plate 30 proximate the lower edge 192 of the first plate 26. When the first plate 26 is coupled with the second plate 30, the post 34 is positioned between the forward and rear stops 28, 196 of the first plate 26. In some examples, the post 34 may be positioned to contact the lower edge 192 of the first plate 26 and may be configured to move along the lower edge 192 between the forward and rear stops 28, 196. In other examples, the post 34 may be spaced apart from the lower edge 192 and configured to contact only the forward and rear stops 28, 196 of the first plate 26.

When the first plate 26 is in the first position, the post 34 is positioned to contact the forward stop 28 (see FIG. 13). When the first plate 26 is in the second position, the post 34 is positioned to contact the rear stop 196. Each stop 28, 196 is configured to prevent over rotation of the first plate 26 relative to the second plate 30. As previously introduced, in various examples, the first plate 26 may be configured to be retained in an intermediate position between the first and second positions (FIG. 12). In the intermediate position, the post 34 does not contact either of the stops 28, 196. It will be understood that the seatback frame 12 may be in any one of the positions in combination with any position of the first plate 26 relative to the second plate 30 without departing from the scope of the present disclosure.

The use of the pivot assembly 24 having first and second plates 26, 30 is configured to allow the seatback frame 12 to be moved into the folded position and have the panel 36 be positioned substantially horizontal to form a flat surface. This arrangement allows the seating assembly 10 to be used in any position within the vehicle and still include the lumbar portion. Specifically, the seatback frame 12 is spaced apart from the seat base frame 32 by a distance D necessary to form the substantially horizontal surface. The distance D may be adjusted by adjusting one or more of the position of the stops 28, 196 on the lower edge 192 of the first plate 26, the position of the post 34 on the second plate 30, and/or the position of the guide post 178 on the seatback frame 12. The distance D may be adjusted based on the configuration of the seating assembly 10 and/or vehicle.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A seating assembly comprising:
a seat base frame;
a seatback frame pivotally coupled with the seat base frame and having opposing sides defining a central space, wherein each opposing side has a non-linear front edge and a non-linear rear edge;
a panel configured to be coupled with the seatback frame to cover the central space and form a planar surface along the seatback frame, the panel including upper retention hooks and side retention hooks, wherein the upper retention hooks and the side retention hooks are configured to be engaged with the seatback frame, wherein the panel includes wings positioned to align with the non-linear rear edges of the opposing sides of the seatback frame, and wherein the wings of the panel define spaces for accessing the side retention hooks such that the panel is removably coupled with the seatback frame.

2. The seating assembly of claim 1, wherein the seatback frame further defines upper receiving wells configured to receive the upper retention hooks.

3. The seating assembly of claim 1, wherein the seatback frame includes an inner edge defining the central space and configured to be engaged with the side retention hooks.

4. The seating assembly of claim 1, further comprising:
cushioning positioned proximate the seatback frame; and
cover stock positioned over at least one of the cushioning and the seatback frame, wherein the panel at least partially overlaps one of the cushioning and the cover stock.

5. The seating assembly of claim 1, further comprising:
cushioning positioned proximate the seatback frame;
cover stock positioned over at least one of the cushioning and the seatback frame, wherein the panel is concealed by the cover stock; and
a fastener for at least partially removing the cover stock to access the panel.

6. The seating assembly of claim 1, wherein the panel includes an upper portion defining an opening, and further wherein a child tether attachment member is coupled with the seatback frame and is accessible through the opening.

7. The seating assembly of claim 6, wherein the panel includes a cover coupled with the upper portion to selectively conceal the opening.

8. A seating assembly comprising:
a seatback frame defining a central space and movable between a reclined position, an upright position, and a folded position;
a pivot assembly including:
a first post extending from one of opposing sides of the seatback frame;
a first plate defining a slot configured to receive the first post, wherein the first post is positioned at a first end of the slot when the seatback frame is in the reclined position and is positioned at a second end of the slot when the seatback frame is in the folded position;
a forward stop extending from a lower edge of the first plate;
a second plate pivotally coupled with the first plate and fixedly coupled with a seat base frame, wherein the second plate includes a second post configured to selectively contact the forward stop.

9. The seating assembly of claim 8, wherein the pivot assembly further includes a rear stop coupled with the first plate and configured to selectively contact the second post of the second plate.

10. The seating assembly of claim 8, further comprising:
a panel configured to be coupled with the seatback frame to cover the central space and form a planar surface along the seatback frame.

11. The seating assembly of claim 8, wherein the pivot assembly further includes a spring coupled with the first post and configured to bias the seatback frame toward the reclined position.

12. The seating assembly of claim 8, wherein the seatback frame is spaced apart from the seat base frame in the folded position.

13. A seating assembly comprising:
a seatback frame movable between a reclined position, an upright position, and a folded position and having opposing sides defining a central space, wherein each opposing side has a non-linear front edge and a non-linear rear edge;
a pivot assembly including:
a first plate pivotally coupled with the seatback frame and including a forward stop;
a second plate pivotally coupled with the first plate and fixedly coupled with a seat base frame, wherein the second plate includes a post configured to selectively contact the forward stop; and
a panel configured to be coupled with the seatback frame to cover the central space and form a planar surface along the seatback frame, wherein the panel includes upper retention hooks and side retention hooks configured to be engaged with the seatback frame.

14. The seating assembly of claim 13, wherein the panel includes wings positioned to align with the non-linear rear edges of the opposing sides of the seatback frame and defining receiving spaces aligned with the side retention hooks.

15. The seating assembly of claim 13, wherein the pivot assembly further includes a rear stop coupled with the first plate and configured to selectively contact the post of the second plate.

16. The seating assembly of claim 13, wherein one of the opposing sides of the seatback frame includes a guide post and the first plate of the pivot assembly defines a guide slot configured to receive the guide post.

17. The seating assembly of claim 16, wherein the guide post is positioned at a first end of the guide slot when the seatback frame is in the reclined position and is positioned at a second end of the guide slot when the seatback frame is in the folded position.

18. The seating assembly of claim 13, wherein the seatback frame is spaced apart from the seat base frame in the folded position.

* * * * *